United States Patent
Jiao et al.

(10) Patent No.: US 11,321,370 B2
(45) Date of Patent: May 3, 2022

(54) METHOD FOR GENERATING QUESTION ANSWERING ROBOT AND COMPUTER DEVICE

(71) Applicant: BEIJING BAIDU NETCOM SCIENCE AND TECHNOLOGY CO., LTD., Beijing (CN)

(72) Inventors: Zhenyu Jiao, Beijing (CN); Shuqi Sun, Beijing (CN); Ke Sun, Beijing (CN); Tingting Li, Beijing (CN)

(73) Assignee: BEIJIN BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/031,502

(22) Filed: Sep. 24, 2020

(65) Prior Publication Data
US 2021/0256045 A1  Aug. 19, 2021

(30) Foreign Application Priority Data
Feb. 18, 2020 (CN) .......................... 202010098793.0

(51) Int. Cl.
*G06F 16/332* (2019.01)
*G06F 16/38* (2019.01)
(Continued)

(52) U.S. Cl.
CPC .......... *G06F 16/3329* (2019.01); *G06F 16/35* (2019.01); *G06F 16/38* (2019.01); *G06N 5/043* (2013.01)

(58) Field of Classification Search
CPC .................................................. G06F 16/3329
See application file for complete search history.

(56) References Cited

U.S. PATENT DOCUMENTS

| 2009/0162824 | A1* | 6/2009 | Heck | ...................... G06Q 10/10 434/362 |
| 2019/0341021 | A1* | 11/2019 | Shang | ...................... G10L 15/22 |

FOREIGN PATENT DOCUMENTS

| JP | 2014056376 A | 3/2014 |
| JP | 2017037588 A | 2/2017 |

OTHER PUBLICATIONS

Extended European Search Report for Application No. 21150504.5, dated Jun. 15, 2021, 10 pages.
(Continued)

*Primary Examiner* — Van H Oberly
(74) *Attorney, Agent, or Firm* — Fay Sharpe LLP (57) ABSTRACT

The present disclosure discloses a method for generating a question answering robot, relates to the field of robotics. The specific implementation includes: obtaining field information input by a user, obtaining a field-specific robot from a robot library based on the field information; obtaining a template list corresponding to the field-specific robot, providing the template list to the user, the template list including a plurality of templates; receiving the plurality of templates filled in by the user, the templates filled in by the user including at least one question and an answer corresponding to the at least one question; expanding the at least one question filled in by the user based on a question semantic database to form a combination of questions corresponding to the answer, the answer and the combination of questions forming a question-answer pair; and generating a question answering robot based on the question-answer pair.

12 Claims, 3 Drawing Sheets

(51) Int. Cl.
G06F 16/35 (2019.01)
G06N 5/04 (2006.01)

(56) References Cited

OTHER PUBLICATIONS

Agnese Augello et al., "An Approach to Enhance Chatbot Semantic Power and Maintainability: Experiences within the FRASI Project", Sep. 19, 2012, IEEE Sixth International Conference on Semantic Computing, 8 pages.
Office Action for Japanese Application No. 2020-211025, dated Dec. 21, 2021, 2 pages.

* cited by examiner

METHOD FOR GENERATING QUESTION ANSWERING ROBOT AND COMPUTER DEVICE

CROSS REFERENCE TO RELATED APPLICATIONS

This application is based on and claims priority to Chinese patent applications Serial No. 202010098793.0 filed on Feb. 18, 2020, the entire contents of which are incorporated herein by reference.

FIELD

The present disclosure relates to robotics in a field of artificial intelligence technology, and more particularly, to a method for generating a question answering robot and a computer device.

BACKGROUND

With the advancement of artificial intelligence, building field-specific question answering robots to meet needs in aspects such as customer service, marketing and guidance has become an attempt of many companies to move into the artificial intelligence era. Those field-specific question answering robots can communicate with customers and answer questions of customers. For example, in a maternal and infant scene, a customer may ask: "what fruits can pregnant women eat", "what seafood can pregnant women eat for zinc supplement", etc. A properly configured field-specific question answering robot can answer these questions.

However, when actually building a field-specific question answering robot, developers need to configure many question-answer pairs to satisfy needs of different customers. Therefore, it will take a high labor cost if the developers want to build a field-specific question answering robot with comprehensive functions and good effects.

SUMMARY

The present disclosure provides a method for generating a question answering robot.

Embodiments of a first aspect of the present disclosure provide a method for generating a question answering robot, including: obtaining field information input by a user, and obtaining a field-specific robot from a robot library based on the field information; obtaining a template list corresponding to the field-specific robot, and providing the template list to the user, in which the template list includes a plurality of templates; receiving the plurality of templates filled in by the user, in which the templates filled in by the user include at least one question and an answer corresponding to the at least one question; expanding the at least one question filled in by the user based on a question semantic database to form a combination of questions corresponding to the answer, in which the answer and the combination of questions form a question-answer pair; and generating a question answering robot based on the question-answer pair.

Embodiments of a second aspect of the present disclosure provide an apparatus for generating a question answering robot, including: a first obtaining module, configured to obtain field information input by a user, and to obtain a field-specific robot from a robot library based on the field information; a second obtaining module, configured to obtain a template list corresponding to the field-specific robot, and to provide the template list to the user, in which the template list includes a plurality of templates; a receiving module, configured to receive the plurality of templates filled in by the user, in which the templates filled in by the user include at least one question and an answer corresponding to the at least one question; an expanding module, configured to expand the at least one question filled in by the user based on a question semantic database to form a combination of questions corresponding to the answer, in which the answer and the combination of questions form a question-answer pair; and a generating module, configured to generate a question answering robot based on the question-answer pair.

Embodiments of a third aspect of the present disclosure provide a computer device including at least one processor and a storage device communicatively connected to the at least one processor. The storage device stores an instruction executable by the at least one processor. When the instruction is executed by the at least one processor, the at least one processor may implement the method for generating the question answering robot as described in embodiments of the first aspect.

Embodiments of a fourth aspect of the present disclosure provide a non-transitory computer-readable storage medium having a computer instruction stored thereon. The computer instruction is configured to make a computer implement the method for generating the question answering robot as described in embodiments of the first aspect.

Other effects of the above-mentioned optional implementations will be described below in combination with specific embodiments.

BRIEF DESCRIPTION OF THE DRAWINGS

The accompanying drawings are used for a better understanding of the solution and do not constitute a limitation to the present disclosure.

DETAILED DESCRIPTION

Exemplary embodiments of the present disclosure are described below with reference to the accompanying drawings, which include various details of embodiments of the present disclosure to facilitate understanding, and should be considered as merely exemplary. Therefore, those skilled in the art should recognize that various changes and modifications may be made to embodiments described herein without departing from the scope and spirit of the present disclosure. Also, for clarity and conciseness, descriptions of well-known functions and structures are omitted in the following description.

A method and an apparatus for generating a question answering robot, a computer device and a storage medium according to embodiments of the present disclosure are described below in combination with the accompanying drawings.

Figure 1:
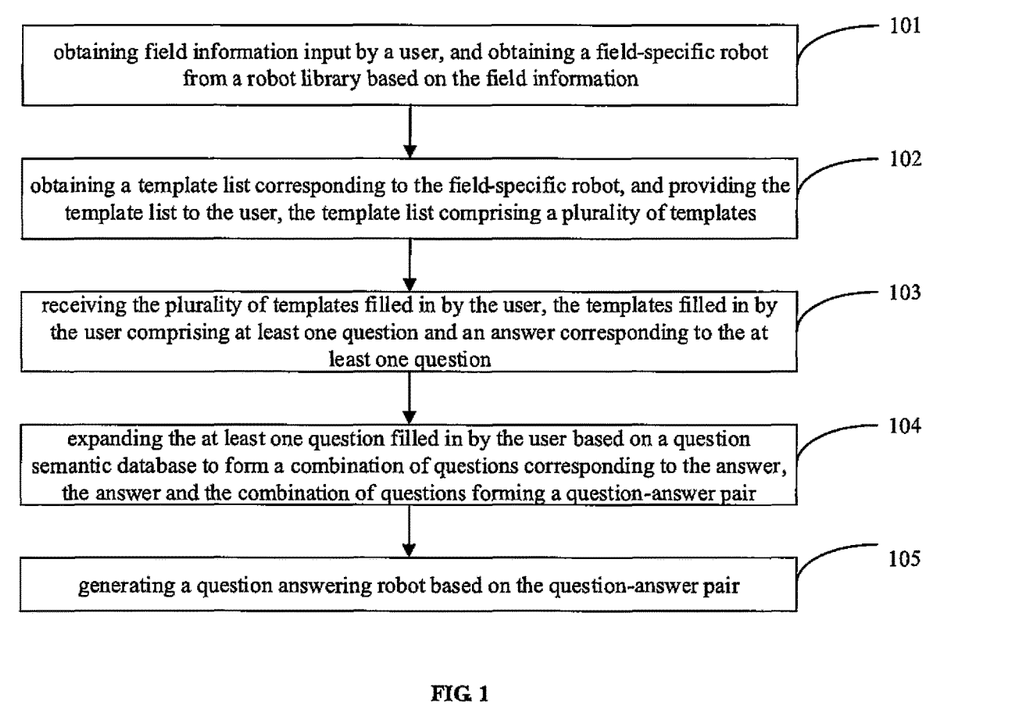
FIG. 1 is a flowchart of a method for generating a question answering robot according to Embodiment 1 of the present disclosure.

FIG. 1 is a flowchart of a method for generating a question answering robot according to Embodiment 1 of the present disclosure.

In embodiments of the present disclosure, as an example, the method for generating the question answering robot is applied to an apparatus for generating a question answering robot. The apparatus for generating the question answering robot may be applied to any computer device, so that the computer device may execute a function of generating the question answering robot.

The computer device may be a personal computer (PC), a cloud device, a mobile device, etc. The mobile device may be any hardware device having an operating system, for example, a mobile phone, a tablet computer, a personal digital assistant, a wearable device, and a vehicle-mounted device.

As illustrated in FIG. 1, the method for generating the question answering robot may include the following steps.

At block 101, field information input by a user is obtained, and a field-specific robot is obtained from a robot library based on the field information.

The robot library refers to robots with various skills configured by developers in the past. For example, an understanding and interaction technology (UNIT) platform is a dialogue system development platform built by Baidu for third-party Chinese developers. Being equipped with industry-leading understanding and dialogue management technology, the UNIT platform merges core capabilities of natural language understanding and interaction technologies, deep learning, and big data accumulated by Baidu over the years. The UNIT platform may quickly empower products of third-party developers with intelligent dialogue and interaction and create a more imaginative future. The UNIT platform stores various skill data configured by the developers in the past, and data of each skill includes all question-answer pairs configured by users for the skill.

In embodiments of the present disclosure, when a user, that is, a new developer, creates a field-specific robot, field information input by the user is obtained first, and then the field-specific robot is obtained from the robot library based on the field information input by the user.

As a possible implementation, a field corresponding to the field information is determined based on a question classifier. And then, the field-specific robot is obtained from the robot library based on the field corresponding to the field information. The question classifier refers to a classifier based on a deep neural network that is pre-trained with a large number of questions.

For example, if the user inputs questions "what are the places to visit in Nanjing", "what are the scenic spots in Nanjing?", and "the ticket price of the Sun Yat-sen Mausoleum", the question classifier may determine, based on the questions inputted by the user, a field corresponding to the questions as the tourism field. After that, a robot corresponding to the tourism field is obtained from the robot library.

As another possible implementation, when creating a field-specific question answering robot, the user may select a field, and then, obtain the field-specific robot from the robot library based on the field selected by the user.

For example, when the user builds a new field-specific question answering robot, if the user chooses the field "tourism", a robot corresponding to the tourism field may be obtained from the robot library established by the developers in the past based on the choice of the user.

At block 102, a template list corresponding to the field-specific robot is obtained, and the template list is provided to the user. The template list includes a plurality of templates.

In embodiments of the present disclosure, after determining the field of the question answering robot to be built by the user and after obtaining the field-specific robot from the robot library, the template list corresponding to the field-specific robot may be obtained, and the template list corresponding to the field-specific robot may be provided to the user.

For example, if the field is determined to be "tourism" based on the field information input by the user, a template list corresponding to a robot in the tourism field may be obtained. The template list may include, for example, where [ ] is, the ticket price of [ ], and so on. The symbol "[ ]" refers to a place name.

At block 103, the plurality of templates filled in by the user are received. The templates filled in by the user may include at least one question and an answer corresponding to the at least one question.

In embodiments of the present disclosure, after the template list corresponding to the field-specific robot is obtained and the template list is provided to the user, the user may fill in keywords for the plurality of templates included in the template list to generate corresponding question-answer pairs.

It should be noted that the plurality of templates filled in by the user include at least one question and an answer corresponding to the at least one question, and the question and the answer form a question-answer pair. For the plurality of templates filled in by the user, when different keywords are input by the user, different question-answer pairs are generated.

For example, suppose that the template in the template list is "where is [ ]". When the user fills in the template, the template may include the question: "where is the Sun Yat-sen Mausoleum" and the answer to the question "it is in Zhongshan Mountain scenic area at the southern foot of Zijin Mountain, Xuanwu District, Nanjing".

At block 104, the at least one question filled in by the user is expanded based on a question semantic database to form a combination of questions corresponding to the answer. The answer and the combination of questions form a question-answer pair.

In embodiments of the present disclosure, after the plurality of templates filled in by the user are received, the at least one question filled in by the user may be expanded based on the question semantic database to supplement synonymous questions, such that a combination of questions corresponding to the answer may be formed. As a result, by filling in templates for common questions in a field and expanding the questions filled in by the user, numerous expanded questions may be obtained, so that a high-level field-specific question answering robot may be obtained and labor cost may be reduced.

It should be noted that the at least one question filled in by the user is expanded based on the question semantic database. The answer to the at least one question and the combination of questions corresponding to the answer form the question-answer pair. In other words, the question-answer pair may include a plurality of synonymous questions and a corresponding answer.

As a possible implementation, after receiving the plurality of templates filled in by the user, keywords that the user fills in each of the plurality of templates are determined, and the at least one question filled in by the user is expanded based on the keywords and question-answer pairs with the same semantic meaning as the template stored in the question semantic database.

For example, the user selects the tourism field. In a recommended template "where is [ ]", the user fills in "Sun Yat-sen Mausoleum" in "[ ]". as the keywords. When the question is expanded based on the question semantic database, {where is [ ]? where is the location of [ ]? where is [ ] located? where can I find [ ]?} will become {where is the Sun Yat-sen Mausoleu? where is the location of the Sun Yat-sen Mausoleu? where is the Sun Yat-sen Mausoleu located? where can I find the Sun Yat-sen Mausoleu?}.

At block 105, a question answering robot is generated based on the question-answer pair.

In embodiments of the present disclosure, after the at least one question filled in by the user is expanded based on the question semantic database and the question-answer pair is formed, a question answering robot for a corresponding field may be generated based on the question-answer pair.

With the method for generating the question answering robot according to embodiments of the present disclosure, the field information input by the user is obtained, and the field-specific robot is obtained from the robot library based on the field information. The template list corresponding to the field-specific robot is obtained, and the template list is provided to the user. The template list includes the plurality of templates. The plurality of templates filled in by the user are received. The templates filled in by the user include the at least one question and the answer corresponding to the at least one question. The at least one question filled in by the user is expanded based on the question semantic database to form the combination of questions corresponding to the answer. The answer and the combination of questions form the question-answer pair. The question answering robot is generated based on the question-answer pair. By obtaining the template list of the field-specific robot, the method allows the user to expand questions for a common question template in the field, so that a high-level question answering robot may be obtained and labor cost may be reduced.

Figure 2:
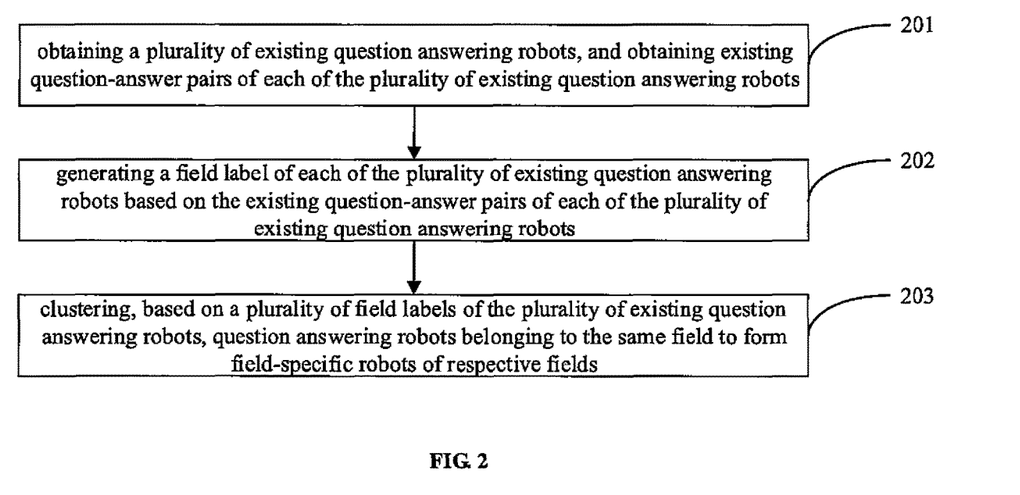
FIG. 2 is a flowchart of a method for generating a question answering robot according to Embodiment 2 of the present disclosure.

Based on the above embodiment, obtaining the field-specific robot from the robot library based on the field information in step 101 is implemented by: obtaining a plurality of existing question answering robots, and obtaining existing question-answer pairs of each of the plurality of existing question answering robots; generating a field label of each of the plurality of existing question answering robots based on the existing question-answer pairs of each of the plurality of existing question answering robots; and clustering, based on a plurality of field labels of the plurality of existing question answering robots, question answering robots belonging to the same field. The above process will be described in detail below with reference to FIG. 2. FIG. 2 is a flowchart of a method for generating a question answering robot according to Embodiment 2 of the present disclosure.

As illustrated in FIG. 2, the method for generating the question answering robot may further include the following steps.

At block 201, a plurality of existing question answering robots are obtained, and existing question-answer pairs of each of the plurality of existing question answering robots are obtained.

The existing question answering robots include existing question answering robots of various fields, for example, the medical field, the maternal and infant field, the education field, and so on.

In embodiments of the present disclosure, the plurality of existing question answering robots and the existing question-answer pairs of each of the plurality of existing question answering robots may be obtained from an existing data platform. For example, existing question answering robots configured by developers in the past and question-answer pairs of each existing question answering robot may be obtained from the UNIT platform. An existing question-answer pair includes a question and an answer to the question.

At block 202, a field label of each of the plurality of existing question answering robots is generated based on the existing question-answer pairs of each of the plurality of existing question answering robots.

In embodiments of the present disclosure, when the plurality of existing question answering robots are obtained, and the existing question-answer pairs of each of the plurality of existing question answering robots are obtained, a question classifier may be configured to identify the existing question-answer pairs to determine a field of the existing question-answer pairs, such that the field label of each of the plurality of existing question answering robots is generated based on the existing question-answer pairs of each of the plurality of existing question answering robots.

For example, if existing question-answer pairs of an existing question answering robot include questions "what fruits can't pregnant women eat", "what seafood should pregnant women eat for zinc supplementation", etc., it may be determined that the existing question answering robot belongs to the maternal and infant field.

At block 203, existing question answering robots belonging to the same field are clustered based on a plurality of field labels of the plurality of existing question answering robots to form the field-specific robot of the same field.

In embodiments of the present disclosure, after the field labels of the existing question answering robots are determined, the question answering robots belonging to the same field are clustered based on the plurality of field labels of the plurality of existing question answering robots to form the field-specific robots of respective fields.

As a possible implementation, semantic meanings of the existing question-answer pairs of each of the plurality of existing question answering robots may be determined. Existing question-answer pairs with the same semantic meaning of each of the plurality of existing question answering robots may be stored in the same question semantic database. Existing question-answer pairs with the same semantic meaning in different question semantic databases may be merged to form the field-specific robot.

In detail, after the plurality of existing question answering robots are obtained, and the existing question-answer pairs of each of the plurality of existing question answering robots are obtained, semantic recognition may be performed on the existing question-answer pairs of each of the plurality of existing question answering robots to determine existing question-answer pairs having the same semantic meanings. For example, "where is the Forbidden City" and "where is the location of the Forbidden City" express the same meaning and may be stored in the same question semantic database. The existing question-answer pairs may be clustered by using a density-based clustering method and taking a group of synonymous questions of the same question-answer pair as a basic unit. After a density-based clustering result is obtained, a plurality of existing question-answer pairs may be stored in the same question semantic database.

It should be noted that there may be duplicate question-answer pairs in the plurality of existing question-answer pairs stored in the same question semantic database. In this case, deduplication processing may be performed on the question-answer pairs. After the question-answer pairs are deduplicated, different question semantic databases may contain question-answer pairs with the same semantic meaning. In this case, it is required to merge existing question-answer pairs with the same semantic meaning in different question semantic databases to form a merged question semantic database. In order to further increase the number of questions in the question semantic database, highly similar questions in a user log that hit a certain question-answer pair may be added to the question semantic database, thereby forming a corresponding field-specific robot.

For example, after determining that the existing question-answer pairs with the same semantic meaning stored in the question semantic database only contain two question-answer pairs, which include questions, for example, "where is the Forbidden City? where is the Forbidden City located?", the same question semantic database may be expanded based on the user log, such that question-answer pairs of the question semantic database may be expanded to six question-answer pairs, which include questions, such as, "where is the Forbidden City? where is the Forbidden City located? where is the location of the Forbidden City, what is the location of the Forbidden City? where can I find the Forbidden City? where is the geographic location of the Forbidden City".

With the method for generating the question answering robot according to embodiments of the present disclosure, the plurality of existing question answering robots are obtained, and the existing question-answer pairs of each of the plurality of existing question answering robots are obtained. The field label of each of the plurality of existing question answering robots is generated based on the existing question-answer pairs of each of the plurality of existing question answering robots. The question answering robots belonging to the same field are clustered based on the plurality of field labels of the plurality of existing question answering robots to form field-specific robots of respective fields. Therefore, based on the plurality of existing question answering robots and the existing question-answer pairs of each of the plurality of existing question answering robots, the field-specific robots of respective fields is generated, such that data is provided for the user to build a question answering robot, and the speed of building the question answering robot may be improved.

Figure 3:
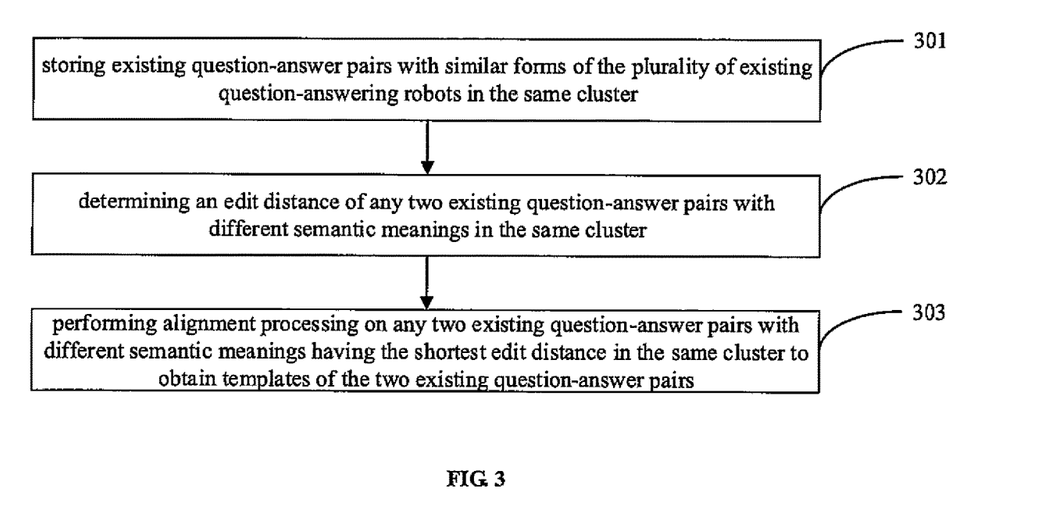
FIG. 3 is a flowchart of a method for generating a question answering robot according to Embodiment 3 of the present disclosure.

On the basis of the above embodiments, obtaining the plurality of templates included in the template list corresponding to the field-specific robot in step 102 is implemented by clustering existing question-answer pairs of existing question-answering robots, and performing alignment processing on any two existing question-answer pairs with different semantic meanings and having the shortest edit distance. The above process will be described in detail below with reference to FIG. 3. FIG. 3 is a flowchart of a method for generating a question answering robot according to Embodiment 3 of the present disclosure.

As illustrated in FIG. 3, the method for generating the question answering robot may further include the following steps.

At block 301, existing question-answer pairs with similar forms of the plurality of existing question answering robots are stored in the same cluster.

The existing question-answer pairs with similar forms refer to that forms of questions in the existing question-answer pairs are similar. For example, "where is the Forbidden City" and "where is the Summer Palace" are existing question-answer pairs with similar forms. The forms of questions being similar may refer to that the questions have the same interrogative or similar interrogatives, the same sentence pattern or similar sentence patterns.

In embodiments of the present disclosure, after the plurality of existing question answering robots and the existing question-answer pairs of each of the plurality of existing question answering robots are obtained, the density-based clustering method is adopted to store the existing question-answer pairs with similar forms of the plurality of existing question-answering robots in the same cluster.

At block 302, an edit distance of any two existing question-answer pairs with different semantic meanings in the same cluster is determined.

The edit distance is used to measure a degree of similarity between two sequences, and refers to the minimum number of editing operations required to transform one sequence into the other sequence.

In embodiments of the present disclosure, for existing question-answer pairs with similar forms in the same cluster, the edit distance of any two existing question-answer pairs with different semantic meanings is calculated.

At block 303, alignment processing is performed on any two existing question-answer pairs with different semantic meanings and having the shortest edit distance in the same cluster to obtain the template of the two existing question-answer pairs.

In embodiments of the present disclosure, the alignment processing is performed on any two existing question-answer pairs with different semantic meanings and having the shortest edit distance in the same cluster to obtain a set of aligned question-answer pairs. For each set of aligned question-answer pairs, a template corresponding to the set of aligned question-answer pairs may be obtained.

As a possible implementation, two questions in the same set of question-answer pairs may be regarded as two loops, and the longest common substring on the two loops may be determined. When a length ratio of the longest common substring to a length of one of the two questions reaches a certain threshold, the template of the set of question-answer pairs may be obtained.

For example, suppose the existing question-answer pairs in the same cluster include questions: "where is the Forbidden City? where is the Summer Palace? what is the direction of the Forbidden City? what is the direction of the Summer Palace". After the alignment processing is performed on any two existing question-answer pairs with different semantic meanings and having the shortest edit distance in the same cluster, two sets of aligned question-answer pairs are obtained, which include "where is the Forbidden City? where is the Summer Palace?" and "what is the direction of the Forbidden City? what is the direction of the Summer Palace?". And then, a template list "where is [ ]? what is the direction of [ ]?" for the field is produced.

With the method for generating the question answering robot according to embodiments of the present disclosure, the existing question-answer pairs with similar forms of the plurality of existing question-answering robots are stored in the same cluster. The edit distance of any two existing question-answer pairs with different semantic meanings in the same cluster is determined. The alignment processing is performed on any two existing question-answer pairs with different semantic meanings and having the shortest edit distance in the same cluster to obtain the templates of the existing question-answer pairs. Therefore, based on the existing question-answer pairs of the existing question answering robots, the templates of the fields corresponding respectively to the existing question answering robots are obtained, thereby helping to increase the speed of the user in building a question answering robot.

To implement the above embodiments, the present disclosure provides an apparatus for generating a question answering robot.

Figure 4:
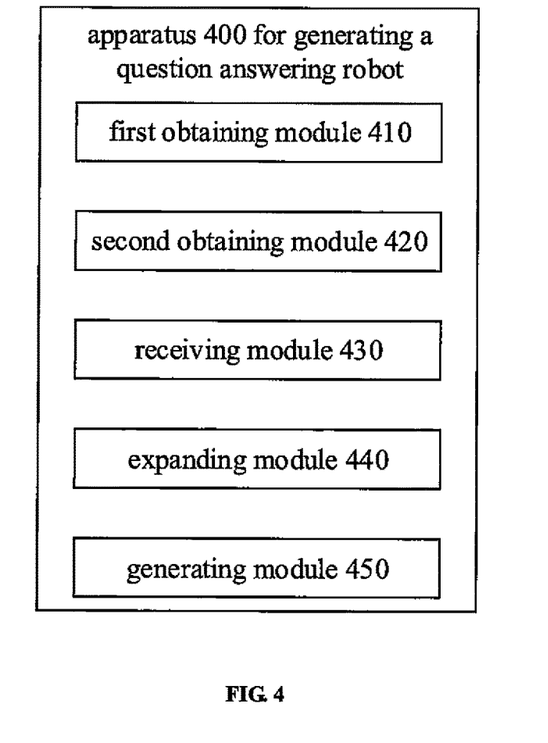
FIG. 4 is a schematic diagram of an apparatus for generating a question answering robot according to Embodiment 4 of the present disclosure.

FIG. 4 is a schematic diagram of an apparatus for generating a question answering robot according to Embodiment 4 of the present disclosure.

As illustrated in FIG. 4, an apparatus 400 for generating a question answering robot may include a first obtaining module 410, a second obtaining module 420, a receiving module 430, an expanding module 440, and a generating module 450.

The first obtaining module 410 is configured to obtain field information input by a user, and to obtain a field-specific robot from a robot library based on the field information.

The second obtaining module 420 is configured to obtain a template list corresponding to the field-specific robot, and to provide the template list to the user. The template list includes a plurality of templates.

The receiving module 430 is configured to receive the plurality of templates filled in by the user. The templates filled in by the user include at least one question and an answer corresponding to the at least one question.

The expanding module 440 is configured to expand the at least one question filled in by the user based on a question semantic database to form a combination of questions corresponding to the answer. The answer and the combination of questions form a question-answer pair.

The generating module 450 is configured to generate a question answering robot based on the question-answer pair.

As a possible implementation, the first obtaining module 410 is configured to: obtain a plurality of existing question answering robots, and obtain existing question-answer pairs of each of the plurality of existing question answering robots; generate a field label of each of the plurality of existing question answering robots based on the existing question-answer pairs of each of the plurality of existing question answering robots; and cluster, based on a plurality of field labels of the plurality of existing question answering robots, question answering robots belonging to a same field to form the field-specific robot of the same field.

As another possible implementation, the first obtaining module 410 is configured to: determine semantic meanings of the existing question-answer pairs of each of the plurality of existing question answering robots; store existing question-answer pairs with the same semantic meaning of each of the plurality of existing question answering robots in the same question semantic database; and merge existing question-answer pairs with the same semantic meaning in different question semantic databases to form the field-specific robot.

As a possible implementation, the plurality of templates in the template list are generated by: storing existing question-answer pairs with similar forms of the plurality of existing question-answering robots in the same cluster; determining an edit distance of any two existing question-answer pairs with different semantic meanings in the same cluster; and performing alignment processing on any two existing question-answer pairs with different semantic meanings and having the shortest edit distance in the same cluster to obtain the template of the two existing question-answer pairs.

As a possible implementation, the expanding module 440 is configured to: determine keywords that the user fills in the plurality of templates; and expand the at least one question filled in by the user based on the keywords and question-answer pairs stored in the question semantic database.

As a possible implementation, the first obtaining module 410 is configured to: determine a field corresponding to the field information based on a question classifier; and obtain the field-specific robot from the robot library based on the field corresponding to the field information.

With the apparatus for generating the question answering robot according to embodiments of the present disclosure, the field information input by the user is obtained, and the field-specific robot is obtained from the robot library based on the field information. The template list corresponding to the field-specific robot is obtained, and the template list is provided to the user. The template list includes the plurality of templates. The plurality of templates filled in by the user are received. The templates filled in by the user include the at least one question and the answer corresponding to the at least one question. The at least one question filled in by the user is expanded based on the question semantic database to form the combination of questions corresponding to the answer. The answer and the combination of questions form the question-answer pair. The question answering robot is generated based on the question-answer pair. By obtaining the template list of the field-specific robot, the method allows the user to expand questions for a common question template in the field, so that a high-level question answering robot may be obtained and labor cost may be reduced.

According to embodiments of the present disclosure, the present disclosure also provides a computer device and a readable storage medium.

Figure 5:
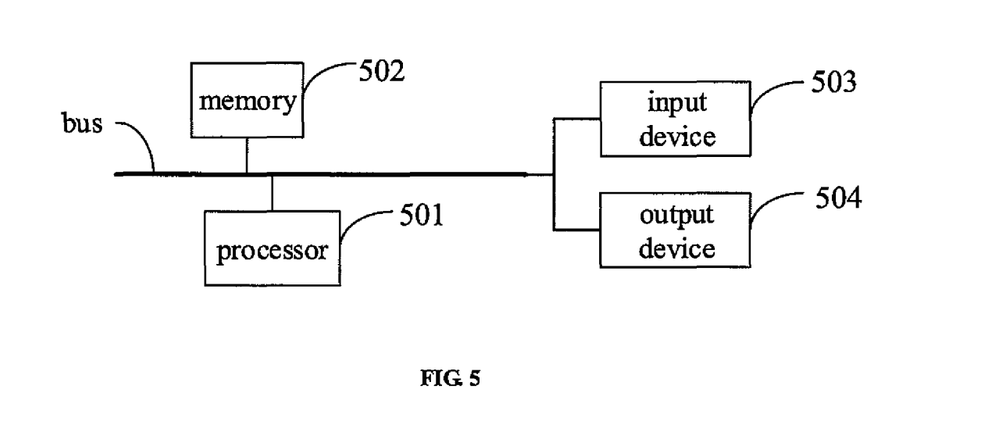
FIG. 5 is a block diagram of a computer device for implementing a method for generating a question answering robot according to embodiments of the present disclosure.

FIG. 5 is a block diagram of a computer device for implementing a method for generating a question answering robot according to embodiments of the present disclosure. The computer device is intended to represent various forms of digital computers, such as a laptop computer, a desktop computer, a workbench, a personal digital assistant, a server, a blade server, a mainframe computer and other suitable computers. The computer device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 5, the computer device includes: one or more processors 501, a memory 502, and interfaces for connecting various components, including a high-speed interface and a low-speed interface. The components are interconnected by different buses and may be mounted on a common motherboard or otherwise installed as required. The processor may process instructions executed within the computer device, including instructions stored in or on the memory to display graphical information of the GUI on an external input/output device (such as a display device coupled to the interface). In other embodiments, when necessary, multiple processors and/or multiple buses may be used with multiple memories. Similarly, multiple computer devices may be connected, each providing some of the necessary operations (for example, as a server array, a group of blade servers, or a multiprocessor system). One processor 501 is taken as an example in FIG. 5.

The memory 502 is a non-transitory computer-readable storage medium according to embodiments of the present disclosure. The memory stores instructions executable by at least one processor, so that the at least one processor executes the method for generating the question answering robot provided by the present disclosure. The non-transitory computer-readable storage medium according to the present disclosure stores computer instructions, which are configured to make the computer execute the method for generating the question answering robot provided by the present disclosure.

As a non-transitory computer-readable storage medium, the memory 502 may be configured to store non-transitory software programs, non-transitory computer executable programs and modules, such as program instructions/modules (for example, the first obtaining module 410, the second obtaining module 420, the receiving module 430, the expanding module 440, and the generating module 450 illustrated in FIG. 4) corresponding to the method for generating the question answering robot according to embodiments of the present disclosure. The processor 501 executes various functional applications and performs data processing of the server by running non-transitory software programs, instructions and modules stored in the memory 502, that is, the method for generating the question answering robot according to the foregoing method embodiments is implemented.

The memory 502 may include a storage program area and a storage data area, where the storage program area may store an operating system and applications required for at least one function; and the storage data area may store data created according to the use of the computer device based on speech translation, and the like. In addition, the memory 502 may include a high-speed random access memory, and may further include a non-transitory memory, such as at least one magnetic disk memory, a flash memory device, or other non-transitory solid-state memories. In some embodiments, the memory 502 may optionally include memories remotely disposed with respect to the processor 501, and these remote memories may be connected to the computer device for generating the question answering robot through a network. Examples of the network include, but are not limited to, the Internet, an intranet, a local area network, a mobile communication network, and combinations thereof.

The computer device configured to implement the method for generating the question answering robot may further include an input device 503 and an output device 504. The processor 501, the memory 502, the input device 503 and the output device 504 may be connected through a bus or in other manners. FIG. 5 is illustrated by establishing the connection through a bus.

The input device 503 may receive input numeric or character information, and generate key signal inputs related to user settings and function control of the computer device based on speech translation, such as a touch screen, a keypad, a mouse, a trackpad, a touchpad, a pointing stick, one or more mouse buttons, trackballs, joysticks and other input devices. The output device 504 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, the field information input by the user is obtained, and the field-specific robot is obtained from the robot library based on the field information. The template list corresponding to the field-specific robot is obtained, and the template list is provided to the user. The template list includes the plurality of templates. The plurality of templates filled in by the user are received. The templates filled in by the user include the at least one question and the answer corresponding to the at least one question. The at least one question filled in by the user is expanded based on the question semantic database to form the combination of questions corresponding to the answer. The answer and the combination of questions form the question-answer pair. The question answering robot is generated based on the question-answer pair. In this manner, developers of the question answering robot may quickly build a high-quality field-specific question answering robot, thereby lowering labor costs and costs of developing the robot.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for generating a question answering robot, comprising:
   obtaining field information input by a user, and obtaining a field-specific robot from a robot library based on the field information;
   obtaining a template list corresponding to the field-specific robot, and providing the template list to the user, the template list comprising a plurality of templates;
   receiving the plurality of templates filled in by the user, the plurality of templates filled in by the user comprising at least one question and an answer corresponding to the at least one question;
   expanding the at least one question filled in by the user based on a question semantic database to form a combination of questions corresponding to the answer, the answer and the combination of questions forming a question-answer pair; and
   generating a question answering robot based on the question-answer pair;
   wherein the field-specific robot is generated by:
   obtaining a plurality of existing question answering robots, and obtaining existing question-answer pairs of each existing question answering robot;
   generating a field label of each existing question answering robot based on the existing question-answer pairs of the existing question answering robot; and
   clustering, based on a plurality of field labels of the plurality of existing question answering robots, question answering robots belonging to a same field to form the field-specific robot of the same field;
   wherein the plurality of templates in the template list are generated by:
   storing existing question-answer pairs with similar forms of the plurality of existing question-answering robots in a same cluster;
   determining an edit distance of any two existing question-answer pairs with different semantic meanings in the same cluster; and
   performing alignment processing on any two existing question-answer pairs with different semantic meanings and having a minimum edit distance in the same cluster to obtain the template of the two existing question-answer pairs.

2. The method of claim 1, wherein clustering, based on the plurality of field labels of the plurality of existing question answering robots, the question answering robots belonging to the same field to form the field-specific robot of the same field comprises:
   determining semantic meanings of the existing question-answer pairs of each existing question answering robot;
   storing existing question-answer pairs with the same semantic meaning of each existing question answering robot in a same question semantic database; and
   merging existing question-answer pairs with the same semantic meaning in different question semantic databases to form the field-specific robot.

3. The method of claim 1, wherein expanding the at least one question filled in by the user based on the question semantic database comprises:
   determining keywords that the user fills in the plurality of templates; and
   expanding the at least one question filled in by the user based on the keywords and question-answer pairs stored in the question semantic database.

4. The method of claim 1, wherein obtaining the field-specific robot from the robot library based on the field information comprises:
   determining a field corresponding to the field information based on a question classifier; and
   obtaining the field-specific robot from the robot library based on the field corresponding to the field information.

5. A computer device, comprising:
   at least one processor; and
   a storage device communicatively connected to the at least one processor; wherein,
   the storage device stores an instruction executable by the at least one processor, and when the instruction is executed by the at least one processor, the at least one processor may implement the method for generating the question answering robot comprising:
   obtaining field information input by a user, and obtaining a field-specific robot from a robot library based on the field information;
   obtaining a template list corresponding to the field-specific robot, and providing the template list to the user, the template list comprising a plurality of templates;
   receiving the plurality of templates filled in by the user, the plurality of templates filled in by the user comprising at least one question and an answer corresponding to the at least one question;
   expanding the at least one question filled in by the user based on a question semantic database to form a combination of questions corresponding to the answer, the answer and the combination of questions forming a question-answer pair; and generating a question answering robot based on the question-answer pair;
wherein the field-specific robot is generated by:
obtaining a plurality of existing question answering robots, and obtaining existing question-answer pairs of each existing question answering robot;
generating a field label of each existing question answering robot based on the existing question-answer pairs of the existing question answering robot; and
clustering, based on a plurality of field labels of the plurality of existing question answering robots, question answering robots belonging to a same field to form the field-specific robot of the same field;
wherein the plurality of templates in the template list are generated by:
storing existing question-answer pairs with similar forms of the plurality of existing question-answering robots in a same cluster;
determining an edit distance of any two existing question-answer pairs with different semantic meanings in the same cluster; and
performing alignment processing on any two existing question-answer pairs with different semantic meanings and having a minimum edit distance in the same cluster to obtain the template of the two existing question-answer pairs.

6. The device of claim 5, wherein clustering, based on the plurality of field labels of the plurality of existing question answering robots, the question answering robots belonging to the same field to form the field-specific robot of the same field comprises:
determining semantic meanings of the existing question-answer pairs of each existing question answering robot;
storing existing question-answer pairs with the same semantic meaning of each existing question answering robot in a same question semantic database; and
merging existing question-answer pairs with the same semantic meaning in different question semantic databases to form the field-specific robot.

7. The device of claim 5, wherein expanding the at least one question filled in by the user based on the question semantic database comprises:
determining keywords that the user fills in the plurality of templates; and
expanding the at least one question filled in by the user based on the keywords and question-answer pairs stored in the question semantic database.

8. The device of claim 5, wherein obtaining the field-specific robot from the robot library based on the field information comprises:
determining a field corresponding to the field information based on a question classifier; and
obtaining the field-specific robot from the robot library based on the field corresponding to the field information.

9. A non-transitory computer-readable storage medium having a computer instruction stored thereon, wherein the computer instruction is configured to make a computer implement the method for generating the question answering robot comprising:
obtaining field information input by a user, and obtaining a field-specific robot from a robot library based on the field information;
obtaining a template list corresponding to the field-specific robot, and providing the template list to the user, the template list comprising a plurality of templates;
receiving the plurality of templates filled in by the user, the plurality of templates filled in by the user comprising at least one question and an answer corresponding to the at least one question;
expanding the at least one question filled in by the user based on a question semantic database to form a combination of questions corresponding to the answer, the answer and the combination of questions forming a question-answer pair; and
generating a question answering robot based on the question-answer pair;
wherein the field-specific robot is generated by:
obtaining a plurality of existing question answering robots, and obtaining existing question-answer pairs of each existing question answering robot;
generating a field label of each existing question answering robot based on the existing question-answer pairs of the existing question answering robot; and
clustering, based on a plurality of field labels of the plurality of existing question answering robots, question answering robots belonging to a same field to form the field-specific robot of the same field;
wherein the plurality of templates in the template list are generated by:
storing existing question-answer pairs with similar forms of the plurality of existing question-answering robots in a same cluster;
determining an edit distance of any two existing question-answer pairs with different semantic meanings in the same cluster; and
performing alignment processing on any two existing question-answer pairs with different semantic meanings and having a minimum edit distance in the same cluster to obtain the template of the two existing question-answer pairs.

10. The medium of claim 9, wherein clustering, based on the plurality of field labels of the plurality of existing question answering robots, the question answering robots belonging to the same field to form the field-specific robot of the same field comprises:
determining semantic meanings of the existing question-answer pairs of each existing question answering robot;
storing existing question-answer pairs with the same semantic meaning of each existing question answering robot in a same question semantic database; and
merging existing question-answer pairs with the same semantic meaning in different question semantic databases to form the field-specific robot.

11. The medium of claim 9, wherein expanding the at least one question filled in by the user based on the question semantic database comprises:
determining keywords that the user fills in the plurality of templates; and
expanding the at least one question filled in by the user based on the keywords and question-answer pairs stored in the question semantic database.

12. The medium of claim 9, wherein obtaining the field-specific robot from the robot library based on the field information comprises:
determining a field corresponding to the field information based on a question classifier; and
obtaining the field-specific robot from the robot library based on the field corresponding to the field information.

* * * * *